United States Patent [19]

Tourre

[11] 4,344,241
[45] Aug. 17, 1982

[54] PLATE FOR CARD DISPLAY BOARD

[75] Inventor: Raymond Tourre, Orange, France

[73] Assignee: S.A. VAL-REX, Orange, France

[21] Appl. No.: 256,817

[22] Filed: Apr. 23, 1981

[30] Foreign Application Priority Data

Apr. 28, 1980 [FR] France ............................ 80 10113

[51] Int. Cl.³ .............................................. G09F 1/10
[52] U.S. Cl. ...................................... 40/124.2; 40/17; 211/55
[58] Field of Search ...................... 40/19.5, 489, 124.2, 40/490, 491, 17, 18, 16, 16.4, 16.6, 508, 611, 122, 124, 20 A, 10 R; 211/50, 55, 56

[56] References Cited

U.S. PATENT DOCUMENTS

| 451,105 | 4/1891 | Bourne | 40/489 |
| 1,331,682 | 2/1920 | Smith | 40/16.4 |
| 2,879,899 | 3/1959 | Shenkin | 211/55 |
| 4,003,470 | 1/1977 | Lagorio et al. | 40/124.2 |
| 4,083,456 | 4/1978 | Genn et al. | 211/55 |
| 4,265,038 | 5/1981 | Crosslen | 40/124.2 |

FOREIGN PATENT DOCUMENTS

| 2614427 | 10/1977 | Fed. Rep. of Germany | 211/55 |
| 961264 | 5/1950 | France | 40/124.2 |
| 984962 | 7/1951 | France | 211/55 |
| 409490 | 10/1966 | Sweden | 40/124.2 |
| 318093 | 9/1929 | United Kingdom | 40/124.2 |
| 877073 | 9/1961 | United Kingdom | 40/611 |

*Primary Examiner*—Gene Mancene
*Assistant Examiner*—John J. Wilson
*Attorney, Agent, or Firm*—Arthur B. Colvin

[57] ABSTRACT

The invention concerns the field of information display boards, and relates to an attachment plate constituted in the form of a plane body comprising:
  on its vertical side edges, two mutually complementary assembling tabs,
  and on the level of its lower edge, a bar designed to fit in one slot of the board.

The present invention finds a particular application with boards designed for the display of T-shaped cards.

7 Claims, 7 Drawing Figures

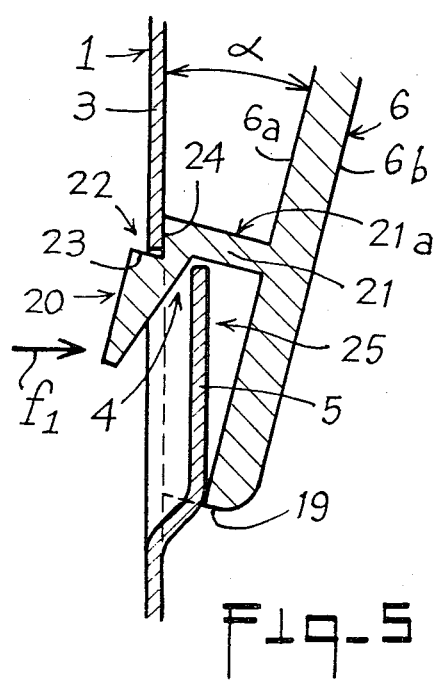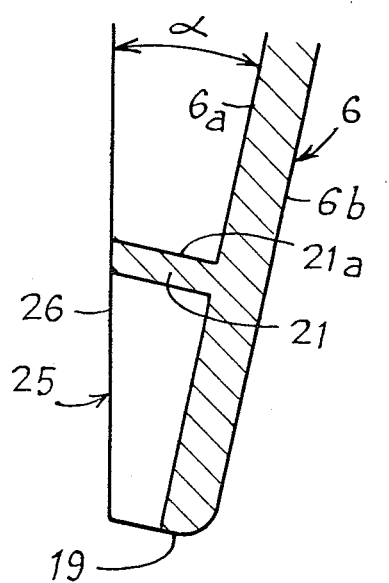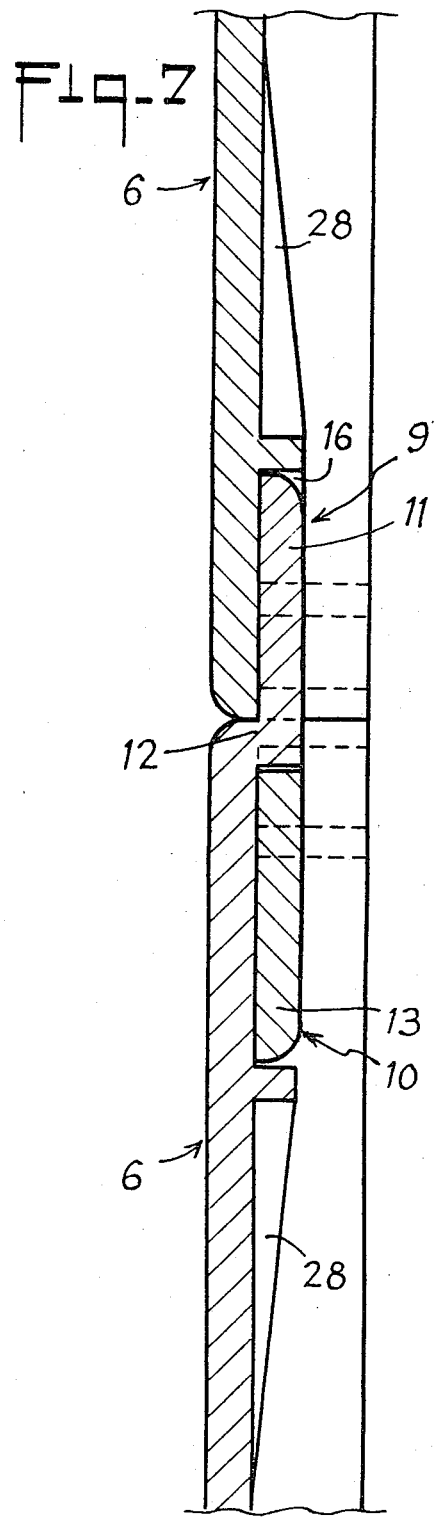

PLATE FOR CARD DISPLAY BOARD

The present invention concerns the field of information display boards or panels and the technical field which is particularly covered is that of panels or boards provided with split-type housings designed to receive cards or other such information display means.

Panels or boards of the aforesaid type, are shaped so as to present vertical and parallel ranges and/or lines of horizontal slots or other openings generally aligned on the same levels and designed to receive information carrying media, and in particular T-shaped cards, i.e. cards whose top parts are wider than their body proper.

The utilization of such a display board consists in depositing the information carriers or cards in the slots, in a predetermined order, vertically, horizontally or else at the intersecting point of rectangular coordinates of reference.

Any changes in the filing of the cards, implicate therefore, for each card involved, retrieving the card from the initially occupied slot and placing it in a new slot corresponding to the new positioning.

Boards of the aforesaid type are perfectly suitable to display information complying with requirements of selection, identification, or positioning, such as listed hereinabove.

But in certain cases, one or more items of information have to follow a continuous linear progress between an origin and an end, in relation for example to a chronological basis.

The slots of each vertical range or line being limited and separated, for those on the same level presented by two contiguous lines or pages, the use of such a panel to display information following a continuous linear development, is unsuitable.

It is the object of the present invention to overcome this disadvantage by proposing an attachment plate which is especially designed to allow the conversion, if only local, of a display panel or board with slots or other openings with a view to delimiting, at least partly, one or more continuous and deep grooves or gutters capable of receiving cards containing indication or information following a continuous linear development.

The object of the invention is therefore to offer to the user of display boards of the type with slots or other openings, the possibility, if necessary, to convert the boards at least partly, so that they can support cards, tapes or other types of information carriers following a mobile or fixed linear development.

One particular object of the invention is to make such a conversion possible without altering the constitution of the display board so that said board can be reutilized for its primary function or be partly modified to procure two possible uses, namely the local display of cards and the display of information following a horizontal linear development.

Another object of the invention is to procure for the user at low cost an attachment plate which is readily adaptable on a display board, requires little storage room and can be stored flat.

The invention further aims at procuring for the user an attachment plate which, when adapted on a board, can form either a groove or gutter to receive an information carrier following a linear development, or else a storage compartment for documents or information carriers of format or thickness incompatible with the inserting or receiving means normally offered by these types of display boards.

According to the invention, the small plate adaptable on a display board offering vertical and parallel ranges of horizontal slots designed to receive information cards or other carriers, is constituted in the form of a plane body which is horizontally at least of equal size to the length of the slots in one range and comprising:

on its vertical side edges, two mutually complementary assembling parts, and on the level of its lower edge a small bar, offset with respect to the plane of the rear face of the body and designed to be engaged in one slot of a line of slots on a board, so that the rear face of the said body delimits with the front face of the board a groove or gutter to receive a card.

The invention will be more readily understood on reading the following description with reference to the accompanying drawings, in which:

FIGS. 5 and 6 are cross-sections on a larger scale, along V—V and VI—VI of FIG. 4;

FIG. 7 is a partial cross-section showing a detail of the object of the invention.

Figure 1:
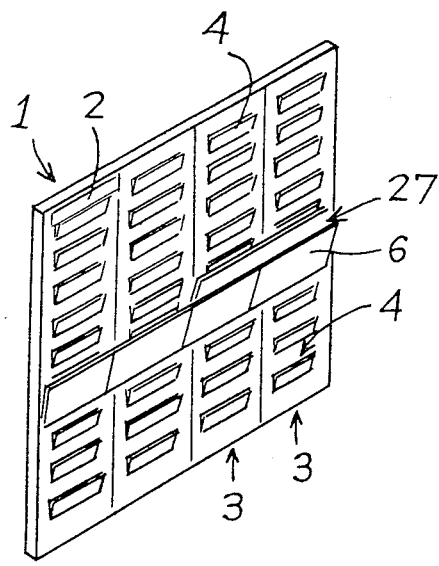
FIG. 1 is a perspective view of a card display panel on which the object of the invention can be adapted.

The object of the invention is designed to allow the conversion of a board or panel 1 designed to display cards such as those designated by the reference 2. In known manner, such a board or panel 1 forms or comprises vertical lines 3 of slots or openings 4, parallel together and oriented horizontally. Preferably, the slots 4 of two adjacent lines 3 are situated on the same horizontal level.

A board or panel 1 can comprise identical slots 4 or in some cases slots of different horizontal length depending on whether cards of identical or different formats are meant to be filed on the said board.

In order to facilitate the insertion or retrieval of the cards 2, each slot 4 is generally formed by a part 5 which is set off laterally so that the two lips of the slot are relatively offset in order to define together an opening which is accessible for a vertical insertion from the top. This particular structure is clearly shown in FIG. 5 which illustrates precisely a cross-section of the part 5 set off laterally from the general plane of the range or line 3.

The part 5 can be produced in many different ways depending on the nature of the material constituting the range or line 3. The conformation can be obtained by stamping and cutting in the case of sheet metal being used, or else by direct molding in the case of plastic material being used.

Figure 2:
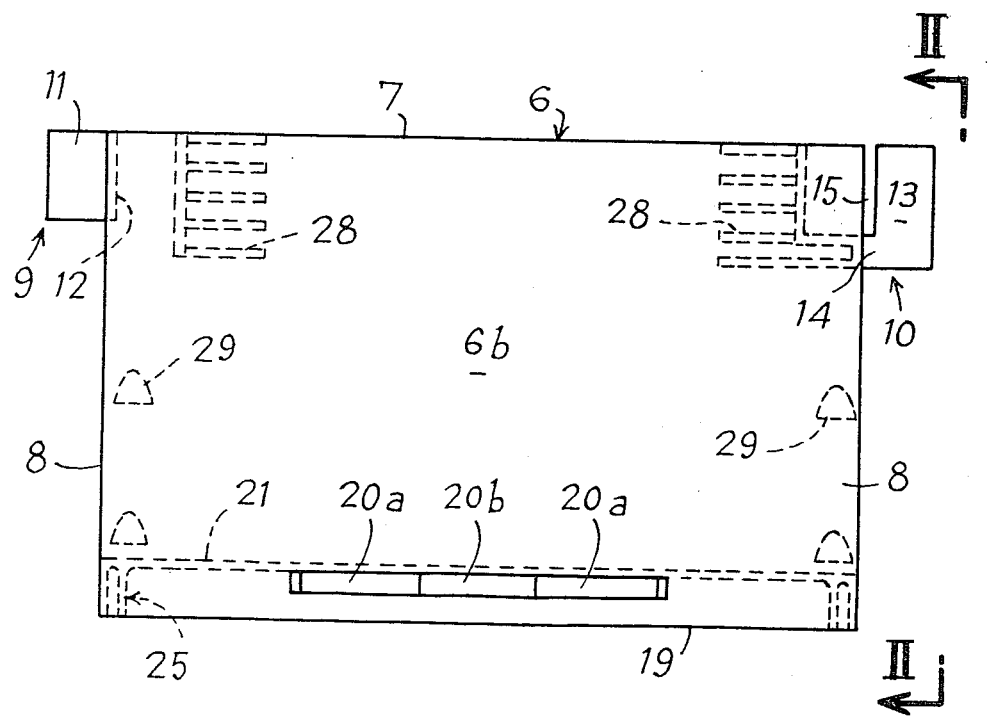
FIG. 2 is an elevational view of the object of the invention.
Figure 3:
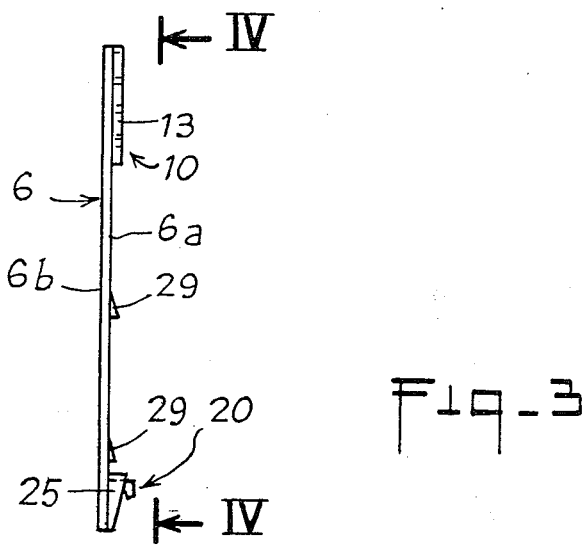
FIG. 3 is a sectional view along II—II of FIG. 2.
Figure 4:
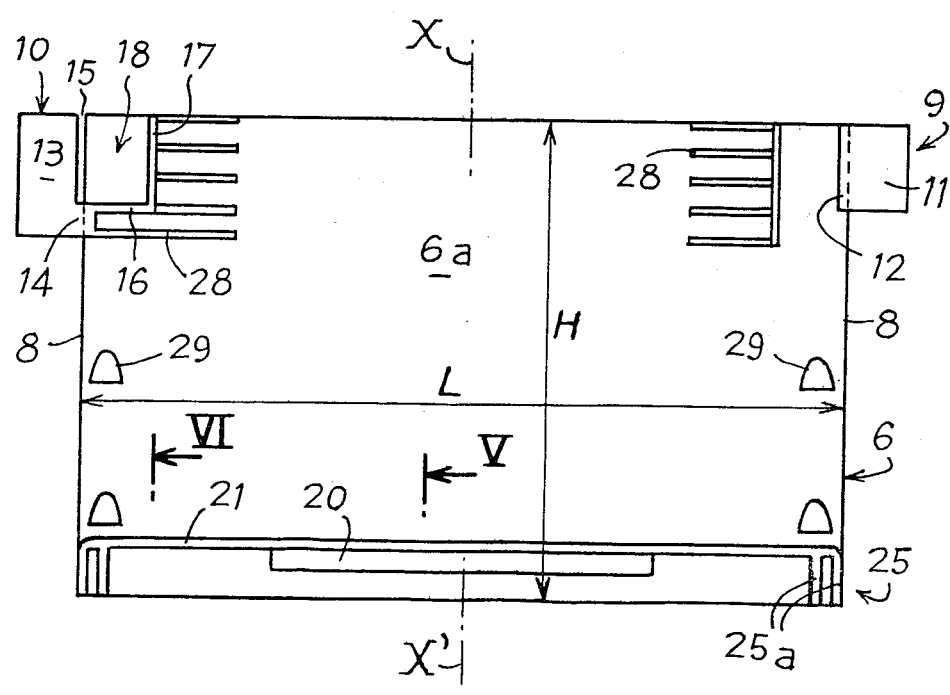
FIG. 4 is a side elevation along line IV–IV of FIG. 3.

The conversion plate adaptable on a board such as that mentioned hereinabove is constituted, as illustrated in FIGS. 2, 3 and 4 by a plane body 6 of general rectangular shape which can be made from any suitable material, such as sheet metal, but preferably plastic material. In such a case, the plane body 6 can, for example, be between 1 mm and 1.5 mm thick, depending on the nature of the constituent material used to produce it.

The plane body 6 is provided, in line with its upper edge 7 and starting from its vertical side edges 8, with two assembling tabs or lugs 9 and 10 of complementary design. The tab 9 is in the form of an extension 11, oblong for example, and in line with the upper edge 7 offset of its thickness from the rear face 6a of the plane body 6 to which it is connected by a joining edge 12.

The assembling tab 10 is constituted by an extending part 13 connected by a tenon 14 to the corresponding edge 8 in such a way as to leave a split portion 15 between the said extending part and the edge 8 over a height and width which correspond to the dimensions of the joining edge 12 of the tab 9. The tab 10 is also offset laterally by its thickness from the body 6 over the rear face 6a of which the tenon extends to form an edge-plate 16 which joins on to the base of a molding 17 reaching substantially the level of the upper edge 7. The molding 17, the edge-plate 16 and the corresponding edge of the tab 10 thus define a housing 18 of similar shape as the tab 9 and open from the upper edge 7.

The plane body 6 is also provided with a fitting bar 20, which is parallel to its lower edge 19 and set off therefrom, said bar 20 extending towards the said edge 19 in offset manner with respect to the plane of the body 6. The bar 20 preferably extends normally in parallel to the plane of the body 6 and from a rib 21 formed perpendicularly from the rear face 6a of the said body. Preferably, also the bar 20 increases in cross-section from its end towards the rib 21. FIG. 5 shows that in the illustrated example the height of the bar is less than the distance separating the rib 21 from the lower edge 19. Generally speaking, the length of the bar 20, which extends also on either sides of the median vertical axis X—X', is less than the length of the slots 4 and, generally, less than the smallest standard dimension of the latter.

FIG. 5 also shows that the bar 20 comprises in its angular part connecting it with the rib 21, a rabbet 22 delimited by a face 23 parallel to the plane of the rib 21 and a face 24 which is diverging with respect to the plane of the rear face 6a towards the upper edge 7. Said inclination, shown in the drawings as α, can vary for example between 10° and 15°.

The rear face 6a of the body 6 is also extended, from the lower edge 19 and substantially on the level of the vertical edges 8, by two abutting heels 25, the edge 26 of each one of which forms a supporting face whose function will be explained here after. Each edge 26 takes on, with respect to the plane of the rear face 6a, an inclination α equal to that of the face 24 of the rabbet 22. Preferably, the heels 25 are interconnected via the rib 21.

FIG. 4 shows that, preferably, each heel 25 is constituted by two protruding parts 25a extending in parallel.

The plate described hereinabove, is designed to constitute an attachment adaptable on a panel or board 1. The adaptation consists in fitting in the bar 20 by its free edge into a free slot 4. The progressive engagement of the bar subjects the lips of the slot to an elastic deformation which increases the lateral shifting of the part 5. The reaction to this elastic deformation causes at the end of the insertion the automatic return of the lips in the initial alignment and their respective insertion in the rabbet 22 and in the re-entrant angular part between the bar 20 and the rib 21.

In this position illustrated in FIG. 5, the supporting face 24 of the rabbet 22 determines the alignment of the body 6 with respect to the plane of the range or line 3, so that the plate is set off and forms an angle α with the said plane. Also in this position, the lower edge 19 is substantially supported at the level of the base of the part 5 whereas simultaneously the supporting faces 26 of the heels 25 are resting against the range or line 3 bordering the part 5 constituting or defining the slot 4.

The plate is thus immobilized in a stable vertical position in both directions via the bar 20, the rib 21 and the rabbet 22. The horizontal immobilization is ensured by the heels 25, designed to cooperate, if necessary with the newly-formed edges of the part 5 which is offset laterally and constitutive of the slot 4.

In this position, illustrated in FIG. 1 and by the cross-section of FIG. 5, the plate extends by forming an angle open at the top, with the plane of the panel, so that the upper portion can easily receive any type of document slipped in between the rear face 6a and the front face of the panel 1, to be brought in resting contact on the upper edge 21a of the rib 21. Such a document is therefore, in any type of case, very easy to file and readily accessible to the user since the opening of the angle α at the level of the upper edge 7 of the plate gives a ready access to insert it and to retrieve it.

When the user wishes to extend the storing compartment such as constituted by the plate fitted as indicated above, he can adapt a second plate on the next vertical range or line, proceeding as previously indicated. Simultaneously, when fitting in the corresponding bar 20 he brings the tab 9 to coincide with the housing 18 of the already fitted-in plate. During the vertical downwards displacement, the joining edge 12 of the tab 9 is engaged in the split 15 and simultaneously the tab 9 is introduced in the housing 18. FIG. 7 shows the mutual cooperation of the faces 9 and 10 which achieve an assembly in the same plane as the two contiguous plates as well as an alignment of the upper edges 7 through the cooperation of the lower edge of the tab 9 with the rim 16 of the tenon 14 of the tab 10. Each of the two successive plates is thus fitted in a slot of two contiguous vertical ranges or rows whilst being joined together in the same plane by means of the tabs 9 and 10. The two plates form together a groove or gutter adapted to receive an information carrier which can occupy a stable position or on the contrary be moved by horizontal sliding, so as to provide, if required, an item of information in step with a chronological scale.

FIG. 1 shows that the panel 1 can carry, for each horizontal level, as many accessory plates as there are vertical ranges or lines defined, so as to form or delimit a recess or groove 27 covering the whole serviceable width.

Preferably, the plane body 6 has a length L which is equal to or a multiple of the basic width, standard or not, of a vertical range or line 3. This enables a modular adaptation and the formation of a continuous groove or gutter 27, which is only partial or complete, with a whole number of attachment plates. The height H of each plate may vary in relation to the height of the information carriers to be inserted.

It is indicated hereinabove that the tabs 9 and 10 are set off by their thickness from the rear face 6a. In order to allow a smooth sliding of the information carriers in the grooves or gutters 27, provision is made to bring on to the rear face 6a inclined guiding ramps 28 starting up from the face 6a to reach a level equal to that of the tabs 9 and 10. In this way, and as shown in FIG. 7, the ramps 28 form guides on either sides of the tabs 9 and 10 and thus enable the free sliding of the documents, cards, tapes or other information carrying means through the grooves or gutters 27. For a likewise purpose, the rear face 6a of each plane body 6 can comprise convex-like projections close to the edges 8.

It is to be noted that the tabs 9 and 10 can also, if necessary, jut out laterally with respect to the front face 6b of the plane body 6, in which case, the rear face no longer has the ramps 28 which are replaced by the projections 29 along the edges 8.

FIG. 2 shows that the bar 20 can be made up of two segments 20a separated one from the other by an opening 20b the length of which is at least equal to twice the distance between the vertical edges of the offset parts 5 and the corresponding longitudinal side of a line 3. In this way, it is possible to place a plate across two contiguous lines 3, especially if each one of the latter comprises slots of length equal to half the length L of the plane body 6.

It follows from the foregoing that the plate according to the invention is an inexpensive attachment to produce, which requires little storage room. A user may then possess a set of such plates and adapt them easily on a board 1 when he requires all or part of said board to have the added function of support with grooves or gutters for the display of information following linear, sequential or chronological variations.

The retrieval of each plate is also an easy operation and is obtained by exerting a pressure in the direction of arrow $f_1$ at the level of the bar 20, with a view to elastically deforming the corresponding part 5 by accentuating the lateral shift and to allowing the release of the face 23 of the rabbet 22 with respect to the upper lip of the corresponding slot 4.

The plates according to the invention can therefore be re-utilized, and their momentary use permits to convert, locally at least, a card display board which can be used again afterwards in its primary function, if required.

The invention is not limited to the description given hereinabove and on the contrary various modifications can be brought thereto without departing from its scope.

What is claimed is:

1. A plate adapted to be mounted on a display board, said plate comprising a plane body provided on its rear face with a bar set back from the lower edge of said body, said plate being adapted to be mounted on a board designed for the display of T-shaped cards, said board being of the type which includes vertical and parallel lines of superposed horizontal slots, said plate including a plane body having a horizontal dimension at least of equal size to the length of the slots, said plate comprising on its vertical side edges two mutually complementary assembling parts, an attachment rib on the rear face of said body, a bar projecting rearwardly from said rib, said bar being directed toward the lower edge of said body and being of a height smaller than the distance between the lower edge of said body and the upper edge of said bar, said bar being disposed parallel to and a distance above the lower edge of said body, said bar including a rabbit and a rearwardly directed face portion at the junction of said bar and rib, said face portion diverging forwardly and downwardly relative to the plane of said body at an acute angle, said body including on its rear face adjacent the vertical side edges thereof a pair of rearwardly projecting heels, the rearmost face of said heels extending forwardly and downwardly at an angle substantially identical to said acute angle of said rearwardly directed face portion.

2. Plate as claimed in claim 1, wherein said plate is produced in the form of a plane body comprising a bar increasing in cross-section from its lower edge towards the attachment rib.

3. Plate as claimed in claim 1, wherein said rib connects the two abutting heels, and said heels are separated by a distance greater than the length of one slot, and which project over a mean distance at least equal to the lateral shifting of the panel part defining the slot.

4. Plate as claimed in one of claims 1, 2 or 3, wherein the said bar is constituted by at least two portions separated one from the other by a distance equal to that separating two slots on the same horizontal level on a display board.

5. Plate as claimed in claim 1, wherein the assembling parts extending from the vertical sides of the plane body are offset by their thickness from the rear face of the plane body and are joined up to the said face by means of inclined ramps.

6. Plate as claimed in claim 5, wherein said complementary assembling part are fittable for two adjacent plates by a relative vertical sliding movement downwards, and when interfit keep the said adjacent plates in firm position in the same plane.

7. Plate as claimed in claim 5 or 6, wherein the said assembling parts comprise two assembling tabs, one of which defines with the plane body a housing limited downwardly by an edge-plate forming an insertion abutment for the complementary tab of an adjacent plate.

* * * * *